United States Patent
Wu (10) Patent No.: US 8,873,483 B2
(45) Date of Patent: Oct. 28, 2014

(54) METHOD OF HANDLING SEMI-PERSISTENT SCHEDULING CELL RADIO NETWORK TEMPORARY IDENTIFIER AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 59 days.

(21) Appl. No.: 13/114,048

(22) Filed: May 24, 2011

(65) Prior Publication Data

US 2011/0299483 A1    Dec. 8, 2011

Related U.S. Application Data

(60) Provisional application No. 61/350,931, filed on Jun. 3, 2010.

(51) Int. Cl.
*H04W 72/12* (2009.01)
*H04L 5/00* (2006.01)
*H04W 8/26* (2009.01)

(52) U.S. Cl.
CPC .............. *H04L 5/001* (2013.01); *H04L 5/0078* (2013.01); *H04L 5/0091* (2013.01); *H04W 8/26* (2013.01); *H04W 72/1289* (2013.01)
USPC ........................................................ 370/329

(58) Field of Classification Search
CPC ..... H04L 5/001; H04L 5/0078; H04L 5/0091; H04W 72/042; H04W 72/1289; H04W 8/26
USPC .............. 370/252, 329, 352, 470, 436, 395.4, 370/431; 455/432.1, 450, 509, 431, 451, 455/453–455
See application file for complete search history.

(56) References Cited

U.S. PATENT DOCUMENTS 8,326,292 B2    12/2012    Lin
2009/0298493 A1*  12/2009    Lin ............................ 455/432.1
2011/0103327 A1*   5/2011    Lee et al. ....................... 370/329

FOREIGN PATENT DOCUMENTS

CN      101600206 A     12/2009
WO    2010018990 A2      2/2010
WO    2010129617 A1     11/2010

OTHER PUBLICATIONS

European patent application No. 11004462.5, European Search Report mailing date: Sep. 6, 2011.
Alcatel-Lucent Shanghai Bell, Alcatel-Lucent, "Discussion on SPS related open issue", 3GPP TSG-RAN WG2 Meeting #70, R2-102878, May 10-14, 2010, Montreal, Canada, XP050423173, p. 1-3.
Panasonic, "Details of SPS operation for carrier aggregation", 3GPP TSG-RAN WG1 Meeting #60bis, R1-102014, 3GPP TSG-RAN WG2 Meeting #69bis, R2-102087, Apr. 12-16, 2010, Beijing, China, XP050419347, p. 1-3.

(Continued)

*Primary Examiner* — Jae Y Lee
*Assistant Examiner* — Jean F Voltaire
(74) *Attorney, Agent, or Firm* — Winston Hsu; Scott Margo (57) ABSTRACT

A method of handling Semi-Persistent Scheduling (SPS) Cell Radio Network Temporary Identifier (C-RNTI) for a mobile device configured with a primary component carrier, at least one secondary component carrier and an SPS C-RNTI in a wireless communication system is disclosed. The method comprises steps of performing a Physical Downlink Control Channel (PDCCH) validation process for an SPS information; and determining the SPS information is valid if the PDCCH validation process is valid and the SPS information is received on the primary component carrier.

9 Claims, 5 Drawing Sheets

(56) References Cited

OTHER PUBLICATIONS

RAN2, "LS on Primary Component Carrier and Semi Persistent Scheduling", 3GPP TSG RAN WG1 Meeting #61, R1-102602, May 10-14, 2010, Montreal, Canada, 3GPP TSG-RAN2 Meeting #69bis, R2-102654, Apr. 12-16, 2010, Beijing, China, XP050489239, p. 1.
European patent application No. 12172857.0, European Search Report mailing date: Sep. 14, 2012.
Zte, "On LS for the CIF application cases in SPS scheduling", 3GPP TSG-RAN WG1#61, R1-102893, May 10-14, 2010, Montreal, Canada, XP050420035, p. 1-2.
Office Action mailed on Nov. 5, 2012 for the Japanese Application No. 2011-125635, filing date Jun. 3, 2011, pp. 1-2.
3GPP TS 36.321 v9.2.0, Mar. 2010.
3GPP TS 36.213 v9.1.0, Mar. 2010.
3GPP TSG-RAN WG2 Meeting #70, R2-103427, Stage 2 description of Carrier Aggregation, May 2010.
Panasonic et al., "PDCCH validation for semi-persistent scheduling", 3GPP TSG-RAN Meeting #55, R1-084598, Nov. 10-14, 2008, Prague CZ.
3rd Generation Partnership Project; Technical Specification Group Radio Access Network; Evolved Universal Terrestrial Radio Access (E-UTRA); Physical layer procedures (Release 9), 3GPP TS 36.213 V9.3.0 (Sep. 2010), pp. 1-80.
Notice of allowance mailed on Jan. 30, 2013 for the Korean application No. 10-2011-0053796, filing date Jun. 3, 2011, pp. 1-2.
Office Action mailed on Jun. 3, 2013 for the China application No. 201110148608.5, filing date Jun. 3, 2011, p. 1-10.

* cited by examiner

METHOD OF HANDLING SEMI-PERSISTENT SCHEDULING CELL RADIO NETWORK TEMPORARY IDENTIFIER AND RELATED COMMUNICATION DEVICE

CROSS REFERENCE TO RELATED APPLICATIONS

This application claims the benefit of U.S. Provisional Application No. 61/350,931, filed on Jun. 3, 2010 and entitled "Method and Apparatus for handling SPS C-RNTI in a wireless communication system", the contents of which are incorporated herein by reference.

BACKGROUND OF THE INVENTION

1. Field of the Invention

The present invention relates to a method used in a wireless communications system and related communication device, and more particularly, to a method of handling Semi-Persistent Scheduling (SPS) Cell Radio Network Temporary Identifier (C-RNTI) in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

A long term evolution-advanced (LTE-A) system, as its name implies, is an evolution of the LTE system. The LTE-A system targets faster switching between power states, improves performance at a cell edge, and includes subjects, such as bandwidth extension, coordinated multipoint transmission/reception (CoMP), UL multiple-input multiple-output (MIMO), etc.

For bandwidth extension, carrier aggregation is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. An LTE-A specification supports carrier aggregation for both continuous and non-continuous component carriers with each component carrier limited to a maximum of 110 resource blocks. The carrier aggregation increases a bandwidth flexibility by aggregating the non-continuous component carriers. A component carrier is used as an UL component carrier or a downlink (DL) component carrier. Further, there is a one-to-one correspondence between the UL component carrier and the DL component carrier, i.e., each UL component carrier is paired with a corresponding DL component carrier. In an LTE-A time-division duplex (TDD) system, the UL component carrier and DL component carrier are the same component carrier.

When the UE is configured with the carrier aggregation (CA), the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively. Moreover, the component carriers configured to the UE necessarily consists of one DL primary component carrier (PCC) and one UL primary component carrier. Component carriers other than the primary component carriers are named UL or DL secondary component carriers (SCCs). The numbers of UL and DL secondary component carriers are arbitrary, and are related to the UE capability and available radio resource. In carrier aggregation, the UE only has one RRC connection with the network. At RRC connection establishment/re-establishment/handover, one serving cell provides the NAS mobility information, and at RRC connection re-establishment/handover, one serving cell provides the security input. This serving cell is referred to as the Primary Cell (PCell). In the downlink, the carrier corresponding to the PCell is the Downlink Primary Component Carrier (DL PCC) while in the uplink it is the Uplink Primary Component Carrier (UL PCC). The PCell can not be de-activated, but can be changed by a handover procedure.

Under such a configuration, semi-persistent downlink resources can only be configured for the primary component carrier. Similarly as for the downlink, semi-persistent uplink resources can only be configured for the primary component carrier. Therefore, when the UE receives an SPS uplink or downlink information (i.e. a downlink assignment or uplink grant), the UE determines a Physical Downlink Control Channel (PDCCH) validation process for the SPS information is valid if all the following conditions are met:
  (a) The CRC parity bits obtained for the PDCCH payload are scrambled with the Semi-Persistent Scheduling C-RNTI; and
  (b) The new data indicator field is set to '0'. In case of DCI formats 2, 2A and 2B, the new data indicator field refers to the one for the enabled transport block.

After the UE determines the PDCCH validation process is valid in a physical (PHY) layer of the UE, the PHY layer delivers the Semi-Persistent Scheduling information to a Medium Access Control (MAC) layer of the UE for processing the downlink or uplink information and following operations.

However, in order to resolve the C-RNTI shortage issue by reusing a same Semi-Persistent Scheduling C-RNTI in different component carriers, an eNB may assign the same Semi-Persistent Scheduling C-RNTI to at least two UEs having different primary cells (PCells). In other words, the Semi-Persistent Scheduling C-RNTI is unique in a component carrier only. For example, a UE1 has a first PCell corresponding to a component carrier CC1 and another UE2 has a second PCell corresponding to another component carrier CC2. The UE1 and UE2 can be configured the same Semi-Persistent Scheduling C-RNTI.

Under such a situation, the UE configured with semi-persistent uplink or downlink resources and multiple component carriers (i.e. one primary component carrier and at least one secondary component carrier) may receive a downlink assignment or uplink grant with Semi-Persistent Scheduling C-RNTI and the downlink assignment or uplink grant allocates downlink or uplink resources on a secondary component carrier (i.e. corresponding to a SCell). According to the current prior art, the UE processes the downlink or uplink resources. However this causes a serious issue because the UE uses the downlink or uplink resources which may be allocated for another UE, which is configured the same Semi-Persistent Scheduling C-RNTI and the secondary component carrier of the UE as a primary component carrier.

SUMMARY OF THE INVENTION

The disclosure therefore provides a method and related communication device for handling Semi-Persistent Scheduling (SPS) Cell Radio Network Temporary Identifier (C-RNTI).

A method of handling Semi-Persistent Scheduling (SPS) Cell Radio Network Temporary Identifier (C-RNTI) for a mobile device configured with a primary component carrier, at least one secondary component carrier and an SPS C-RNTI in a wireless communication system is disclosed. The method comprises steps performing a Physical Downlink Control Channel (PDCCH) validation process for an SPS information; and determining the SPS information is valid if the PDCCH validation process is valid and the SPS information is received on the primary component carrier.

A method of handling Semi-Persistent Scheduling (SPS) Cell Radio Network Temporary Identifier (C-RNTI) for a mobile device configured with a primary component carrier, at least one secondary component carrier and an SPS C-RNTI in a wireless communication system is disclosed. The method comprises steps of performing a Physical Downlink Control Channel (PDCCH) validation process for an SPS information according to whether the SPS information is received on the primary component carrier.

A method of handling Semi-Persistent Scheduling (SPS) Cell Radio Network Temporary Identifier (C-RNTI) for a mobile device configured with a primary component carrier, at least one secondary component carrier, an SPS C-RNTI and a C-RNTI in a wireless communication system is disclosed. The method comprises steps of receiving a resource information; and decoding CRC parity bits in the resource information according to on which of the primary component carrier and the at least one secondary component carrier the resource information is received.

A communication device of a wireless communication system for handling Semi-Persistent Scheduling (SPS) Cell Radio Network Temporary Identifier (C-RNTI) is disclosed. The communication device is configured with a primary component carrier, at least one secondary component carrier and an SPS C-RNTI, and comprises means for performing a Physical Downlink Control Channel (PDCCH) validation process for an SPS information; and means for determining the SPS information is valid if the PDCCH validation process is valid and the SPS information is received on the primary component carrier.

A communication device of a wireless communication system for handling Semi-Persistent Scheduling (SPS) Cell Radio Network Temporary Identifier (C-RNTI) is disclosed. The communication device is configured with a primary component carrier, at least one secondary component carrier and an SPS C-RNTI, and comprises means for performing a Physical Downlink Control Channel (PDCCH) validation process for an SPS information according to whether the SPS information is received on the primary component carrier.

A communication device of a wireless communication system for handling Semi-Persistent Scheduling (SPS) Cell Radio Network Temporary Identifier (C-RNTI) is disclosed. The communication device is configured with a primary component carrier, at least one secondary component carrier, an SPS C-RNTI and a C-RNTI, and comprises means for being; means for receiving a resource information; and means for decoding CRC parity bits in the resource information according to on which of the primary component carrier and the at least one secondary component carrier the resource information is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
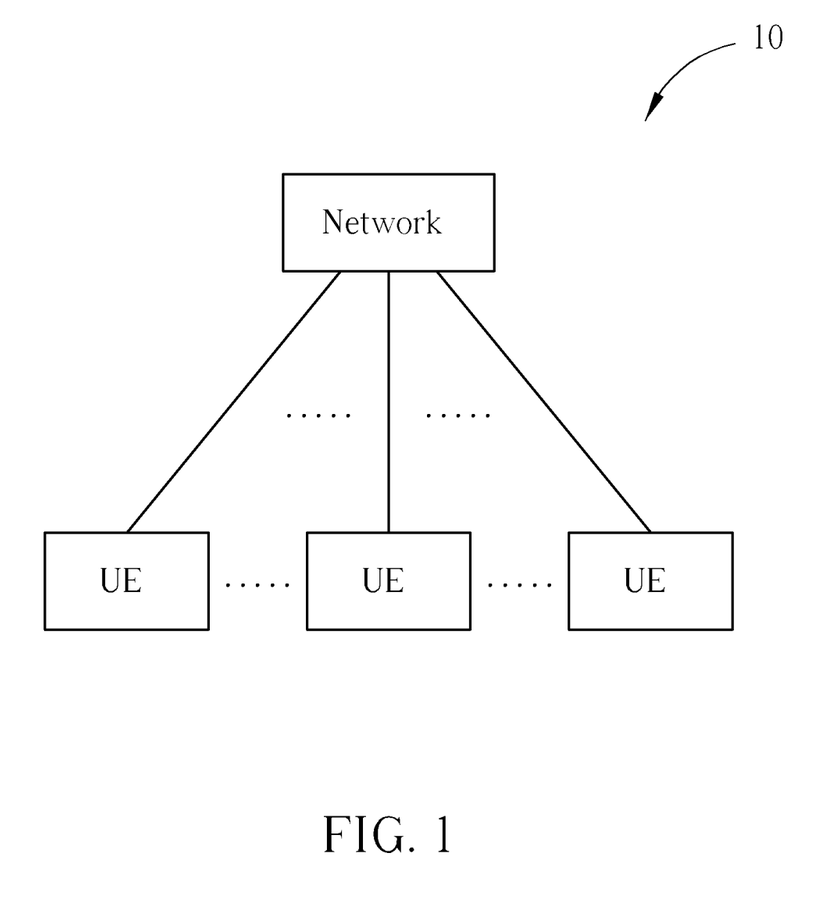
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
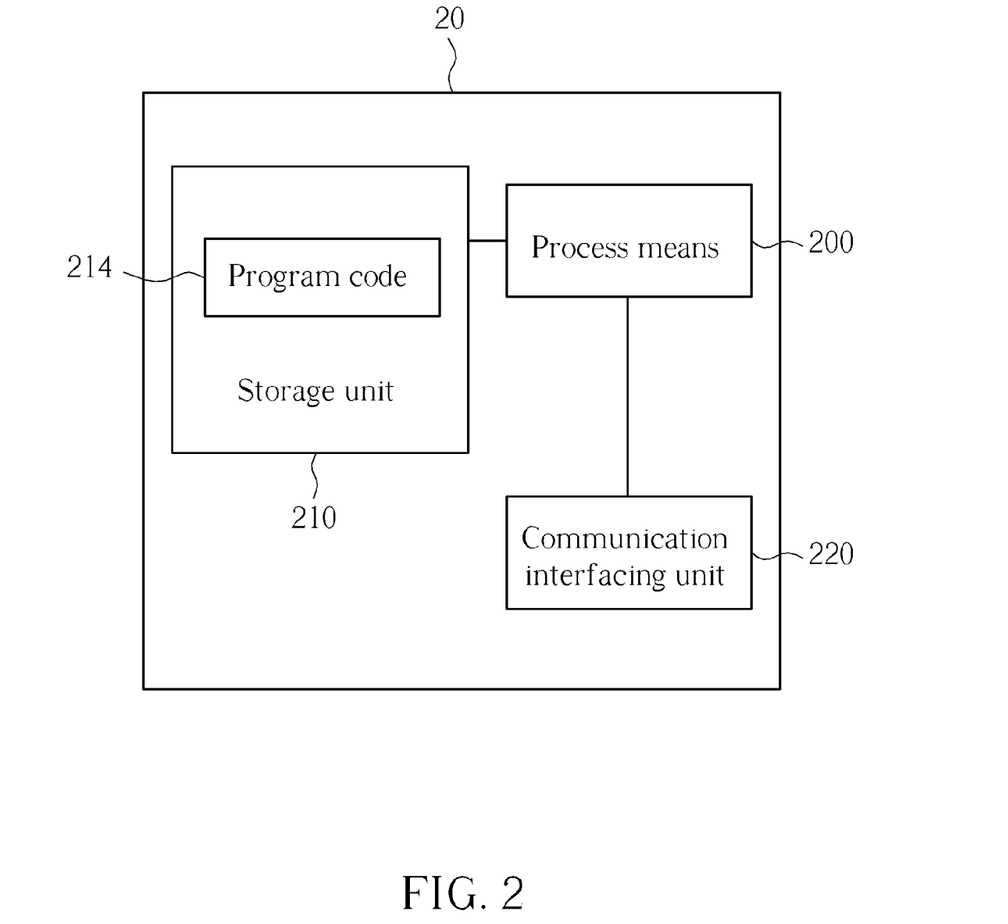
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
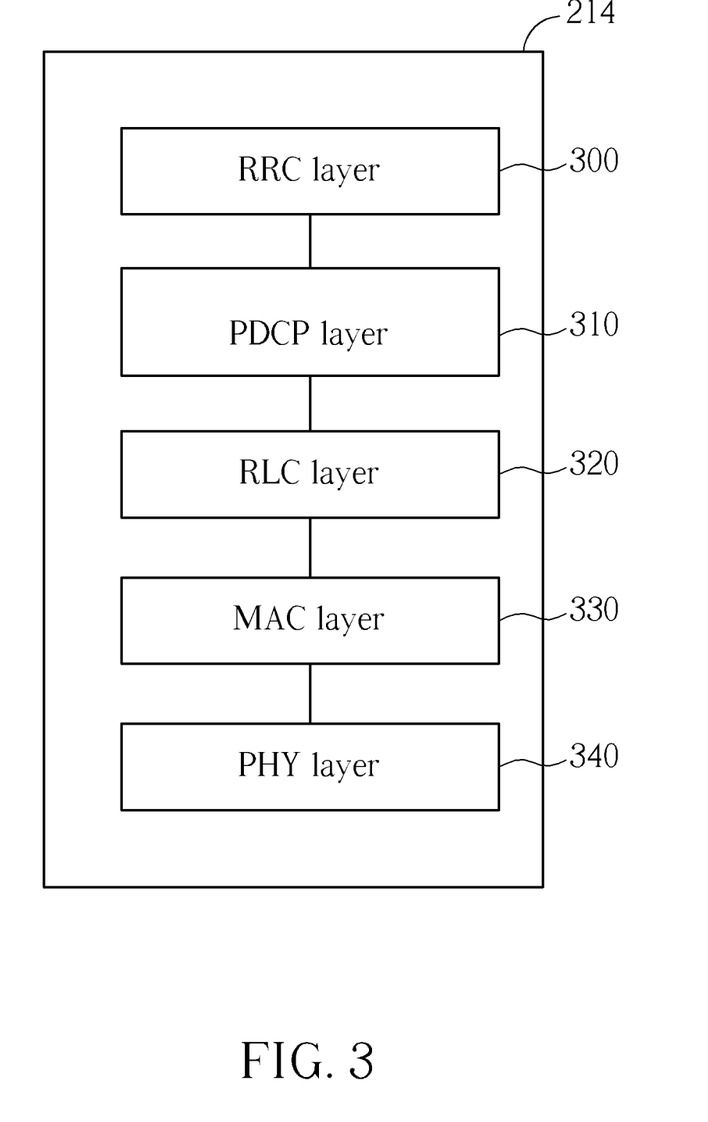
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 includes functions to receive and transmit physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH).

In LTE-A system, the PHY layer 340 and the MAC layer 330 may support a Carrier Aggregation (CA) technology, which enables the UE to perform data transmission and/or reception through one or multiple component carriers. In such a situation, the embodiments of the present invention provide the program code 214 for the UE to effectively and correctly handle Semi-Persistent Scheduling (SPS) Cell Radio Network Temporary Identifier (C-RNTI) without misusing SPS resources of another UE, such that the network can resolve the C-RNTI shortage issue by reusing a same Semi-Persistent Scheduling C-RNTI in different component carriers.

Figure 4:
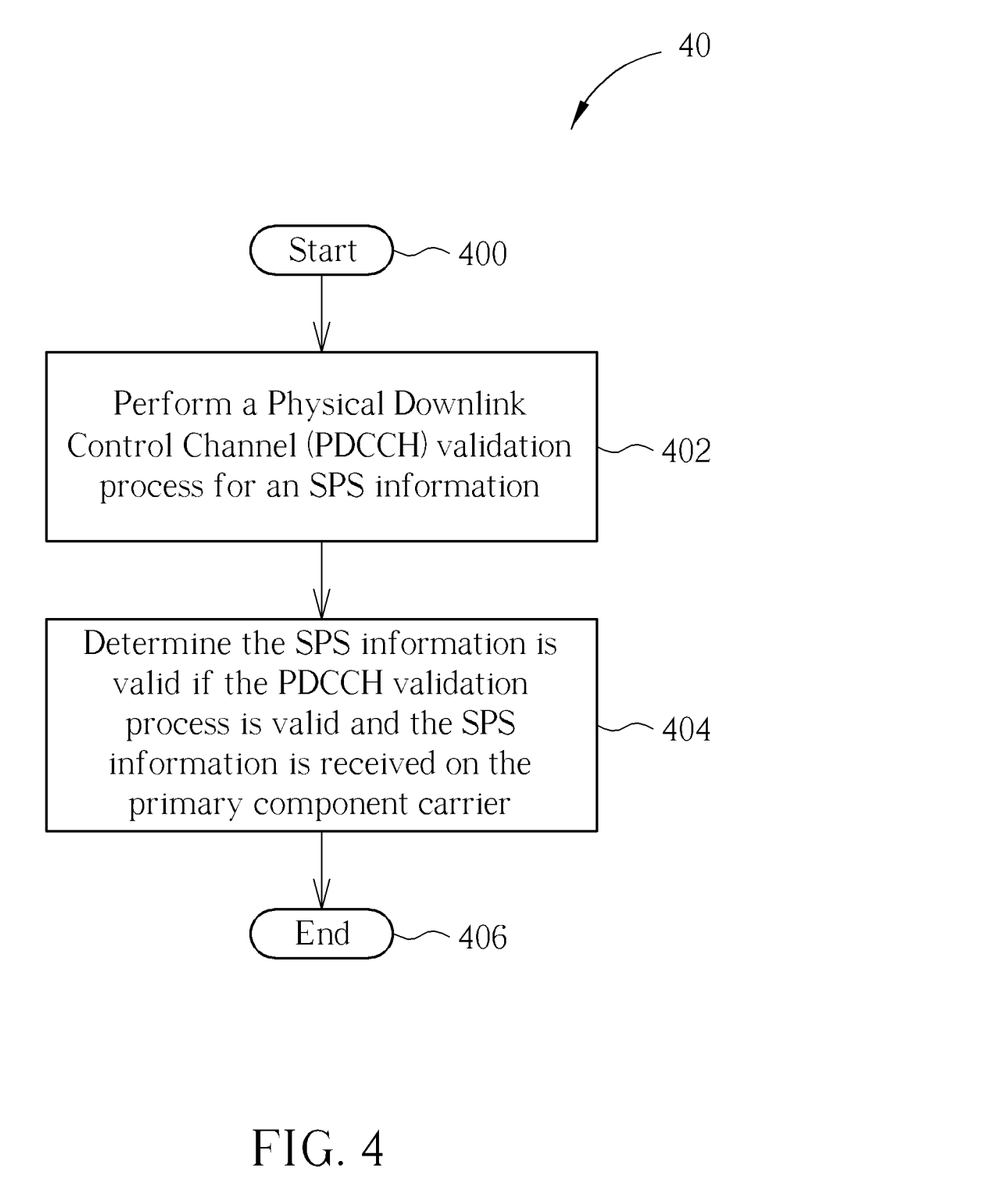
FIG. 4 is a flow chart of a process according to an embodiment of the present invention.

Please refer to FIG. 4, which is a flow chart of a process 40 according to an embodiment of the present invention. The process 40 is used for handling SPS C-RNTI for a UE in a wireless communication system. The wireless communication system could be the wireless communication system 10, and the UE is configured with a primary component carrier, at least one secondary component carrier and an SPS C-RNTI. The process 40 can be compiled into the program code 214 and includes the following steps:

Step 400: Start.

Step 402: Perform a Physical Downlink Control Channel (PDCCH) validation process for an SPS information.

Step 404: Determine the SPS information is valid if the PDCCH validation process is valid and the SPS information is received on the primary component carrier.

Step 406: End.

According to the process 40, the UE is configured with a primary component carrier, at least one secondary component carrier (e.g. corresponding to a PCell and at least one SCell) and an SPS C-RNTI. When the UE receives an SPS information (i.e. a downlink assignment or uplink grant) on one of the primary component carrier and the at least one secondary component carrier, the UE perform a Physical Downlink Control Channel (PDCCH) validation process for the SPS information. Then, the UE determines the SPS information is valid if the PDCCH validation process is valid and the SPS information is received on the primary component carrier.

In detail, the UE performs the PDCCH validation process for the SPS information in a PHY layer of the UE, i.e. the UE determines the PDCCH validation process is valid if all the following conditions are met:

(a) The CRC parity bits obtained for the PDCCH payload are scrambled with the Semi-Persistent Scheduling C-RNTI; and (b) The new data indicator field is set to '0'.

Then, the PHY layer delivers the SPS information and a component carrier (CC) information to a MAC layer of the UE if the PDCCH validation process is valid, wherein the CC information indicates whether the SPS information is received on the primary component carrier. Under such a situation, the MAC layer can determine whether the SPS information is valid according to the CC information. If the CC information indicates the SPS information is received on the primary component carrier, the MAC layer determines the SPS information is valid; otherwise, the MAC layer determines the SPS information is invalid. As a result, the UE can determine whether the SPS information is valid according to whether the SPS information is received on the primary component carrier in the MAC layer, so as to avoid misusing SPS resources of another UE.

Figure 5:
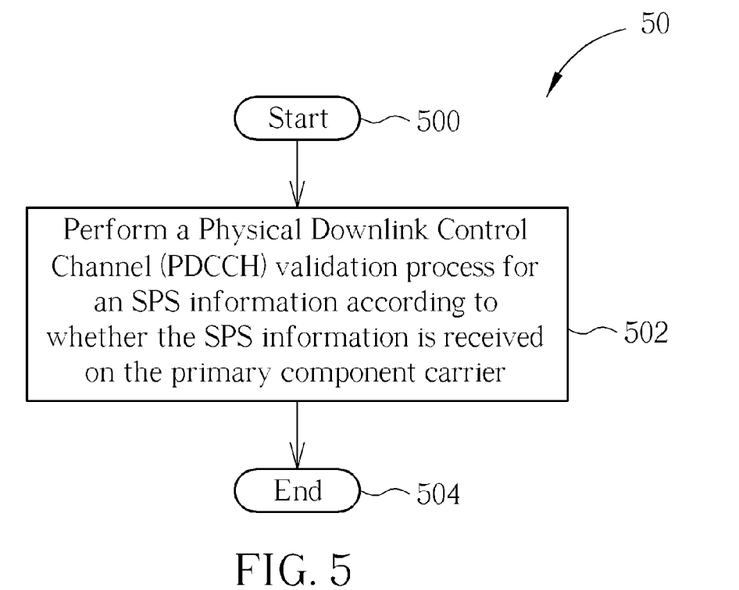
FIG. 5 is a flow chart of a process according to an embodiment of the present invention.

Please refer to FIG. 5, which is a flow chart of a process 50 according to an embodiment of the present invention. The process 40 is used for handling SPS C-RNTI for a UE in a wireless communication system. The wireless communication system could be the wireless communication system 10, and the UE is configured with a primary component carrier, at least one secondary component carrier and an SPS C-RNTI. The process 50 can be compiled into the program code 214 and includes the following steps:

Step 500: Start.

Step 502: Perform a Physical Downlink Control Channel (PDCCH) validation process for an SPS information according to whether the SPS information is received on the primary component carrier.

Step 504: End.

According to the process 50, the UE is configured with a primary component carrier, at least one secondary component carrier (e.g. corresponding to a PCell and at least one SCell) and an SPS C-RNTI. When the UE receives an SPS information (i.e. a downlink assignment or uplink grant) on one of the primary component carrier and the at least one secondary component carrier, the UE performs a Physical Downlink Control Channel (PDCCH) validation process in a PHY layer for the SPS information according to whether the SPS information is received on the primary component carrier.

In other words, other than the validation conditions of the prior art, the UE further determines whether the PDCCH validation process is valid according to whether the SPS information is received on the primary component carrier, i.e. all the following conditions should be met:

(a) The CRC parity bits obtained for the PDCCH payload are scrambled with the Semi-Persistent Scheduling C-RNTI;

(b) The new data indicator field is set to '0'; and (c) The SPS information PDCCH is received on the primary component carrier.

If the PDCCH validation process is valid (implying the SPS information PDCCH is received on the primary component carrier), the PHY layer delivers the SPS information to a MAC layer of the UE for processing the downlink or uplink information and following operations; otherwise, the PHY layer does not deliver the SPS information to the MAC layer. As a result, the UE can determine whether the PDCCH validation process for the SPS information is valid according to whether the SPS information is received on the primary component carrier in the PHY layer, so as to avoid misusing SPS resources of another UE.

Figure 6:
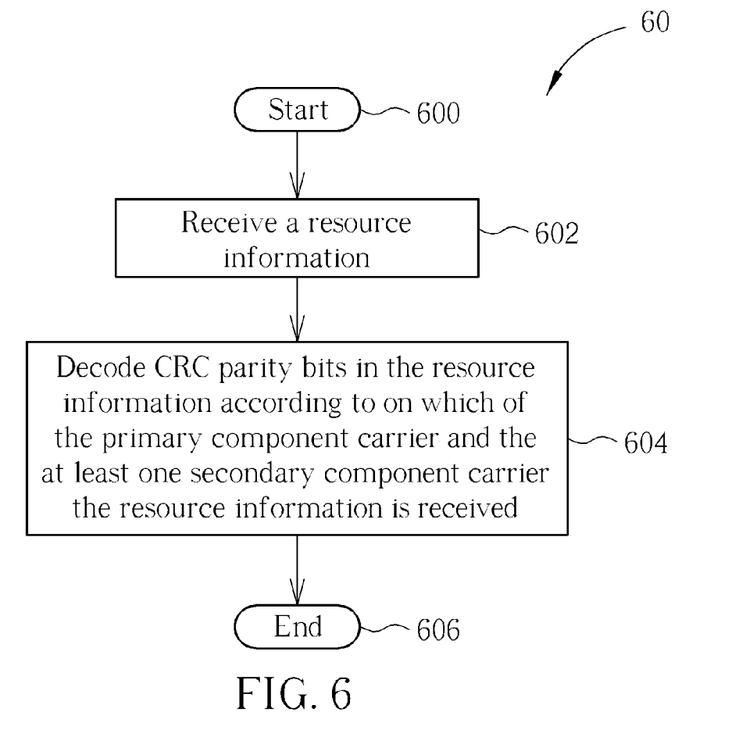
FIG. 6 is a flow chart of a process according to an embodiment of the present invention.

Please refer to FIG. 6, which is a flow chart of a process 60 according to an embodiment of the present invention. The process 60 is used for handling SPS C-RNTI for a UE in a wireless communication system. The wireless communication system could be the wireless communication system 10, and the UE is configured with a primary component carrier, at least one secondary component carrier an SPS C-RNTI and a C-RNTI. The process 60 can be compiled into the program code 214 and includes the following steps:

Step 600: Start.

Step 602: Receive a resource information.

Step 604: Decode CRC parity bits in the resource information according to on which of the primary component carrier and the at least one secondary component carrier the resource information is received.

Step 606: End.

According to the process 60, the UE is configured with a primary component carrier, at least one secondary component carrier (e.g. corresponding to a PCell and at least one SCell), an SPS C-RNTI and a C-RNTI. When the UE receives an resource information (i.e. a downlink assignment or uplink grant) on one of the primary component carrier and the at least one secondary component carrier, the UE decodes CRC parity bits in the resource information according to on which of the primary component carrier and the at least one secondary component carrier the resource information is received.

In detail, if the resource information is received on one of the at least one secondary component carrier, the UE decodes the CRC parity bits in the resource information only with the C-RNTI; on the other hand, if the resource information is received on one of the primary component carrier, the UE decodes the CRC parity bits in the resource information with the C-RNTI or the SPS C-RNTI. Under such a situation, if the UE determines that CRC parity bits obtained for the PDCCH payload are not scrambled with the C-RNTI, the UE then decodes CRC parity bits with the Semi-Persistent Scheduling C-RNTI. Therefore, the process 60 speeds up decoding of PDCCH when an SPS information is received on the at least one secondary component since CRC parity bits in the SPS information received on the at least one secondary component are not decoded (i.e. the PDCCH validation process for the SPS information is invalid). As a result, the UE can decode CRC parity bits in the resource information according to where the resource information is received, so as to avoid misusing SPS resources of another UE while speeding up decoding of PDCCH when the SPS information is received a secondary component.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

In the prior art, when the network resolves the C-RNTI shortage issue by reusing a same Semi-Persistent Scheduling C-RNTI in different component carriers, the UE may misuse resources of another UE, which is configured the same Semi-Persistent Scheduling C-RNTI and the secondary component carrier of the UE as a primary component carrier.

In comparison, in an embodiment of the present invention, the UE can determine whether the SPS information is valid according to whether the SPS information is received on the primary component carrier in the MAC layer, so as to avoid misusing SPS resources of another UE. In another embodiment of the present invention, the UE can determine whether the PDCCH validation process for the SPS information is valid according to whether the SPS information is received on the primary component carrier in the PHY layer, so as to avoid misusing SPS resources of another UE. In a further embodiment of the present invention, the UE can decode CRC parity bits in the resource information according to where the resource information is received, so as to avoid misusing SPS resources of another UE while speeding up decoding of PDCCH when the SPS information is received a secondary component.

To sum up, the present invention can handle SPS C-RNTI according to where the resource information is received, so as to avoid misusing SPS resources of another UE, such that the network can resolve the C-RNTI shortage issue by reusing a same Semi-Persistent Scheduling C-RNTI in different component carriers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling Semi-Persistent Scheduling (SPS) Cell Radio Network Temporary Identifier (C-RNTI) for a mobile device configured with a primary component carrier, at least one secondary component carrier and an SPS C-RNTI in a wireless communication system, the method comprising:
   performing a Physical Downlink Control Channel (PDCCH) validation process for an SPS information;
   determining the SPS information is valid if the PDCCH validation process is valid and if the SPS information is received on the primary component carrier rather than received on any of the at least one secondary component carrier; and
   determining the SPS information is not valid if the PDCCH validation process is valid and if the SPS information is received on any of the at least one secondary component carrier;
   wherein the primary component carrier is corresponding to a primary cell, and the primary component carrier and the at least one secondary component carrier are supported by carrier aggregation defined by a long term evolution-advanced specification.

2. The method of claim 1, wherein the SPS information is a downlink assignment or an uplink grant.

3. The method of claim 1, wherein the step of performing the PDCCH validation process for the SPS information further comprises:
   performing the PDCCH validation process for the SPS information in a physical (PHY) layer; and
   the PHY layer delivering the SPS information and a component carrier (CC) information to a Medium Access Control (MAC) layer if the PDCCH validation process is valid;
   wherein the CC information indicates whether the SPS information is received on the primary component carrier.

4. The method of claim 3, wherein the step of determining the SPS information is valid if the PDCCH validation process is valid and the SPS information is received on the primary component carrier comprises:
   the MAC layer determining the SPS information is valid if the CC information indicates the SPS information is received on the primary component carrier.

5. A method of handling Semi-Persistent Scheduling (SPS) Cell Radio Network Temporary Identifier (C-RNTI) for a mobile device configured with a primary component carrier, at least one secondary component carrier and an SPS C-RNTI in a wireless communication system, the method comprising:
   performing a Physical Downlink Control Channel (PDCCH) validation process for an SPS information according to on which of the primary component carrier and the at least one secondary component carrier the SPS information is received;
   wherein the PDCCH validation process is valid if the SPS information is received on the primary component carrier rather than received on any of the at least one secondary component carrier;
   wherein the PDCCH validation process is invalid if the SPS information is received on any of the at least one secondary component carrier;
   wherein the primary component carrier is corresponding to a primary cell, and the primary component carrier and the at least one secondary component carrier are supported by carrier aggregation defined by a long term evolution-advanced specification.

6. The method of claim 5, wherein the SPS information is a downlink assignment or an uplink grant.

7. A method of handling Semi-Persistent Scheduling (SPS) Cell Radio Network Temporary Identifier (C-RNTI) for a mobile device configured with a primary component carrier, at least one secondary component carrier, an SPS C-RNTI and a C-RNTI in a wireless communication system, the method comprising:
   receiving a resource information; and
   decoding CRC parity bits in the resource information according to on which of the primary component carrier and the at least one secondary component carrier the resource information is received;

wherein the CRC parity bits in the resource information are decoded with the C-RNTI or the SPS C-RNTI if the resource information is received on the primary component carrier rather than received on any of the at least one secondary component carrier;

wherein the CRC parity bits in the resource information are not decoded with the SPS C-RNTI if the resource information is received on any of the at least one secondary component carrier;

wherein the primary component carrier is corresponding to a primary cell, and the primary component carrier and the at least one secondary component carrier are supported by carrier aggregation defined by a long term evolution-advanced specification.

8. The method of claim 7, wherein the resource information is a downlink assignment or an uplink grant.

9. The method of claim 7, wherein the step of decoding the CRC parity bits in the resource information according to on which of the primary component carrier and the at least one secondary component carrier the resource information is received comprises:

decoding the CRC parity bits in the resource information with the C-RNTI if the resource information is received on one of the at least one secondary component carrier.

* * * * *